(12) United States Patent
Dam-Johansen et al.

(10) Patent No.: US 7,931,783 B2
(45) Date of Patent: Apr. 26, 2011

(54) PYROLYSIS METHODS AND APPARATUS

(75) Inventors: Kim Dam-Johansen, Frederiksværk (DK); Niels Bech, Virum (DK); Peter A. Jensen, København S (DK)

(73) Assignee: Danmarks Tekniske Universitet, Lyngby (DK)

( * ) Notice: Subject to any disclaimer, the term of this patent is extended or adjusted under 35 U.S.C. 154(b) by 460 days.

(21) Appl. No.: 11/919,653

(22) PCT Filed: May 3, 2006

(86) PCT No.: PCT/DK2006/000241
§ 371 (c)(1),
(2), (4) Date: Oct. 31, 2007

(87) PCT Pub. No.: WO2006/117005
PCT Pub. Date: Nov. 9, 2006

(65) Prior Publication Data
US 2008/0264771 A1 Oct. 30, 2008

Related U.S. Application Data

(60) Provisional application No. 60/676,959, filed on May 3, 2005.

(30) Foreign Application Priority Data

May 3, 2005 (EP) ..................................... 05076034

(51) Int. Cl.
*C10B 53/02* (2006.01)
*C10C 5/00* (2006.01)
*C10B 47/22* (2006.01)

(52) U.S. Cl. .................. 201/3; 201/21; 201/29; 201/41; 202/96; 202/218; 202/267.1; 202/239; 422/198; 422/224

(58) Field of Classification Search ................ 201/3, 21, 201/29, 41; 202/96, 218, 267.1, 239; 422/198, 422/224; 585/240
See application file for complete search history.

(56) References Cited

U.S. PATENT DOCUMENTS 4,942,269 A * 7/1990 Chum et al. .................. 585/240
(Continued)

FOREIGN PATENT DOCUMENTS

CA 2 365 785 6/2003
(Continued)

OTHER PUBLICATIONS

"Ablative Plate Pyrolysis of Biomass for Liquids", Peacocke and Bridgwater, Biomass and Bioeng; vol. 7, No. 1-6, pp. 147-154, 1994, Elsevier Science Ltd.*
(Continued)

*Primary Examiner* — N. Bhat
(74) *Attorney, Agent, or Firm* — Birch, Stewart, Kolasch & Birch, LLP

(57) ABSTRACT

A fast pyrolysis apparatus (200) for producing pyrolysis liquid, such as oil or tar, char and pyrolysis gas from biomass, such as straw, comprises a centrifuge chamber (204) and a rotor (210) arranged to impart rotation on the biomass in the centrifuge chamber to force the biomass outwardly under the action of centrifugal forces. A furnace (206) arranged coaxially around the centrifuge chamber (204) maintains the temperature at an outer reactive wall of the centrifuge chamber at an elevated temperature to effect the pyrolysis process at or near the reactive wall. The apparatus comprises a condenser (218) arranged coaxially with and surrounded by the centrifuge chamber (204). The apparatus may be accommodated by a mobile unit for simultaneously collecting biomass from a field and processing the biomass in the apparatus.

34 Claims, 3 Drawing Sheets

U.S. PATENT DOCUMENTS

| | | | |
|---|---|---|---|
| 4,980,029 A * | 12/1990 | Bolz et al. | 202/105 |
| 5,413,227 A | 5/1995 | Diebold et al. | |
| 5,504,259 A * | 4/1996 | Diebold et al. | 568/697 |
| 5,770,017 A * | 6/1998 | Brown et al. | 201/25 |
| 5,840,102 A * | 11/1998 | McCracken | 95/268 |
| 6,039,774 A * | 3/2000 | McMullen et al. | 48/102 A |
| 6,648,932 B1 | 11/2003 | Maton et al. | |
| 6,830,597 B1 * | 12/2004 | Green | 48/209 |
| 7,156,027 B1 * | 1/2007 | Yokoyama et al. | 110/341 |
| 7,438,785 B2 * | 10/2008 | Meier et al. | 201/21 |
| 7,625,532 B2 * | 12/2009 | Bridgwater et al. | 422/198 |
| 2003/0138365 A1 * | 7/2003 | Obidniak et al. | 422/224 |

FOREIGN PATENT DOCUMENTS

| | | | |
|---|---|---|---|
| DE | 3407236 | * | 9/1985 |
| WO | WO-88/09364 A1 | | 12/1988 |
| WO | WO-92/09671 A1 | | 6/1992 |
| WO | WO-99/66008 A1 | | 12/1999 |
| WO | WO-01/34725 A1 | | 5/2001 |
| WO | WO-03/057800 A1 | | 7/2003 |
| WO | WO 2005/067694 A1 | | 7/2005 |

OTHER PUBLICATIONS

A.G. Linden et al. "A Kinetic Model for the Production of Liquids from the Flash Pyrolysis of Biomass". Chem. Eng. Comm. 1988, vol. 65, pp. 207-221.

Linneborn Johannes, et al: "Mobile Pyrolisis Plant for the Production of Charcoal and Condensable Hydrocarbons from Biomass." Solar Energy R&D. vol. 1, 1981, pp. 176-180.

Weins Jerry, Instr. of Gas Technology. 1980, pp. 713-720 "Mobile Pyrolysis System for On-Site Biomass Conversion to Liquid and Solid Fuels".

Bridgewater et al., "Fast pyrolysis processes for biomass," Renewable and Sustainable Energy Reviews, Elseviers Science, vol. 4, No. 1, 2000, pp. 35-41, pp. 53-56.

* cited by examiner

PYROLYSIS METHODS AND APPARATUS

TECHNICAL FIELD

The present invention relates to a pyrolysis method and a fast pyrolysis apparatus for producing pyrolysis liquid from biomass. The biomass liquid may e.g. comprise pyrolysis oil or tar. A mobile device for collecting biomass and for producing a pyrolysis liquid from the biomass is also disclosed.

BACKGROUND OF THE INVENTION

Conventional pyrolysis is a heated process in the range of 200-500° C. that converts biomass into pyrolysis liquid, char, and gas, usually in the absence of oxygen and focused on obtaining char in high yield. Fast pyrolysis, also referred to as flash pyrolysis, on the other hand is a process, in which biomass is quickly heated to a controlled pyrolysis temperature, and in which the gas phase is cooled quickly, whereby it partly condenses to pyrolysis liquid. This method generally obtains a higher yield of liquid and normally seeks to minimize the yield of the other two products. When the biomass decomposes at the elevated pyrolysis temperature, e.g. 450-600° C., three primary products are formed: gas, pyrolysis liquid and char.

Various methods and apparatus for producing gas or liquid from organic material have been proposed in the prior art. U.S. Pat. No. 5,413,227 discloses an ablative pyrolysis process in a vortex reactor system, and WO 03/057800 discloses an ablative thermolysis reactor including rotating surfaces. WO 92/09671 discloses a method and apparatus employing a vessel, which forms a torus or helix, through which feedstock can be conveyed at a velocity which sustains the feedstock against the outer periphery of the internal surface of the vessel as it transits the vessel. WO 01/34725 discloses an example of flash-pyrolysis in a cyclone. Further examples of pyrolysis apparatus are provided in WO 88/09364 and CA 2 365 785.

Though the prior art pyrolysis systems are useful for many purposes, they have been found to have certain limitations, as some of them are bulky, some have a low efficiency, and some require adjustment of e.g. rotor blades, which reduces overall cost efficiency. It has also been found that one barrier to efficient exploitation of biomass in fuel production is the cost conferred by collection and transportation of the biomass. Biomass is usually collected from growth sites, where it is loaded onto a truck or trailer for transportation thereof to a pyrolysis facility. Due to the relatively low concentration of energy per volume of biomass, production of even small amounts of usable pyrolysis liquid requires collection, transportation and storage of large volumes of biomass.

SUMMARY OF THE INVENTION

It is an object of preferred embodiments of the present invention to provide a pyrolysis method and apparatus, which allow for a compact and efficient pyrolysis assembly. It is a further object of preferred embodiments of the present invention to provide a method and a mobile unit for collecting biomass which improves efficiency in biomass collection and exploitation.

In a first aspect, the invention provides a method for producing pyrolysis liquid from biomass, comprising the step of decomposing the biomass into pyrolysis liquid, char and pyrolysis gas in a fast pyrolysis process, the method comprising the steps of:
feeding the biomass into a centrifuge chamber;
rotating a rotor to impart rotation on biomass distributed in gas volume in the centrifuge, whereby the biomass is forced towards an outer wall of the centrifuge chamber by centrifugal forces;
decomposing the biomass into pyrolysis vapors and char by maintaining said outer wall at a temperature of 350-700 degrees Celsius to effect the pyrolysis process at or near the outer wall of the centrifuge chamber;
separating the pyrolysis vapours and char;
conveying the pyrolysis vapors and char away from the centrifuge chamber;
condensing the at least a portion of said pyrolysis vapors to obtain said pyrolysis liquid and pyrolysis gas.

In a second aspect, the invention provides a fast pyrolysis apparatus for producing pyrolysis liquid, char and pyrolysis gas from biomass, comprising:
a centrifuge chamber delimited by an inner wall and an outer wall;
an inlet through which biomass can be fed into the centrifuge chamber;
a rotor arranged to impart rotation on biomass distributed in gas volume in the centrifuge to force the biomass towards the outer wall under the action of centrifugal forces;
a heating system for maintaining said outer wall at a temperature of 350-700 degrees Celsius to effect the pyrolysis process at or near the outer wall of the centrifuge chamber and to thereby decompose the biomass into char and pyrolysis vapors, which can be condensed to form pyrolysis liquid and pyrolysis gas;
a char conveyor for conveying the char away from the centrifuge chamber;
and wherein:
the inner wall of the centrifuge chamber is permeable to said pyrolysis vapors.

The present pyrolysis method and apparatus confer several benefits. No inert gas for fluidization and heat transport is required, thereby reducing overall dimensions of the apparatus at a given capacity. Additionally, no sand is needed as heat transport or heat transmission medium, thereby reducing wear and tear and eliminating the need for subsequent separation of sand and char. Thanks to the rotational motion imparted on the biomass in the centrifuge chamber, the area of the outer wall of the centrifuge chamber is in contact with the biomass, while centrifugal forces ensure an even pressure of biomass towards the outer wall, thereby ensuring improved utilization of the reactive surface in the pyrolysis apparatus and consequently higher specific capacity. As char is forced towards the outer wall of the centrifuge chamber, gas separation may occur within the centrifuge chamber, i.e. within the pyrolysis chamber itself. As the char particles are forced towards the wall by centrifugal forces and gas may be filtered by passage from the outer wall of the centrifuge chamber through a layer of biomass to an inner wall of the centrifuge chamber, the need for a separate cyclone may be eliminated. Additionally, as biomass is forced towards the reactive surface, i.e. the outer wall of the centrifuge chamber, by centrifugal forces, the need for additional means for imparting the biomass is reduced, thereby reducing wear and tear and consequently maintenance costs. Thanks to the rotational layout of the centrifuge chamber and rotor, there is no need to adjust e.g. angles of blades or distance between blades and a tube wall, as in certain prior art devices. Further, contact between metal parts is eliminated and contact between metal parts and biomass strongly reduced as the rotating motion is imparted on the biomass particles mainly as a result of a similar movement in the gas phase originating from the motion of the rotor.

Operation is accordingly less vulnerable to changes in biomass material properties, such as particle size distribution and humidity as well as to fluctuations of biomass feeding speed to the reactor. As char is conveyed away from the reactor, preferably continuously, a high heat conduction between the reactor wall, i.e. the outer wall of the centrifuge chamber, and the biomass material is ensured, resulting in improved efficiency and improved pyrolysis liquid yield. The improved pyrolysis yield is conferred by a steep temperature gradient in the biomass material.

In the present context, biomass is to be understood as any organic matter, such as plants and animals or residues thereof, such as wood, agricultural and forestry process waste materials, or industrial, human and animal waste, including petrochemical-based waste feedstock. The chemical energy stored in plants and animals derives from solar energy photosynthesis and can be converted to usable liquid, such as oil or tar, in a heated process, i.e. pyrolysis.

The term pyrolysis liquid is to be understood as any organic liquid derived from biomass in a pyrolysis process, such as bio-oil or tar, the components having a boiling point in the range 0-500° C. Pyrolysis vapour is to be understood as any vapour or gas derived from biomass in a pyrolysis process, such as vaporized pyrolysis liquid.

In preferred embodiments of the present invention, biomass in the rotor is subjected to centrifugal forces greater than 2000 times the force of gravity.

The gas phase retention time in the rotor is preferably at most 5 seconds. The ratio of the diameter of the rotor and the diameter of the centrifuge chamber is preferably at least 0.5, such as at least 0.6, 0.7, 1 or at least 1.2.

It has been found that yield of pyrolysis liquid and, subsequently, gas and char is influenced by choice of feed stock, reactor wall temperature, centrifugal force and a combination of reactor gas phase temperature and residence/retention time. Whereas the former parameters determine the initial split between fractions, the latter two work through degradation of the initially formed pyrolysis liquids in the gas phase. The gas phase reactions will result in rearrangements of the molecules, formation of water (dehydration) and cracking of larger molecules constituting the liquid fraction to smaller ones which subsequently cannot be condensed under the moderate conditions employed. Gas phase reactions will therefore act to modify the liquid product in terms of viscosity and water solubility but will also change the yield both on mass and energy basis.

In order to model the effect of gas phase degradation, the reactions can be approximated by first order irreversible chemical reactions following the well-known Ahrrenius expression and furthermore treating the pyrolysis centrifuge as a plug-flow reactor. As a consequence, the degradation will be promoted by both higher temperature and longer residence/retention time, and theoretically it is possible to obtain a certain degree of degradation by an indefinite number of combinations of the two. For most embodiments of the present invention it may be desired that gas phase residence/retention time does not exceed 1 to 2 seconds in order to obtain a liquid product suitable for fuel in acceptable yield (i.e. Bridgwater, A. V., Peacocke, G. V. C. Fast pyrolysis processes for biomass. Renewable & Sustainable Energy Reviews, 4, 2000).

Gas phase residence/retention time is predominantly determined by the active volume of the reactor in combination with the amount of gas purging this volume. For systems where there is no external inert gas purge, the consequence is that the gasses only originate from the pyrolysis reactions of the feedstock. Therefore the residence/retention time and subsequently the liquid product gas phase degradation is predominantly determined by the capacity or feed rate of raw material to the reactor.

In one design of the pyrolysis centrifuge operating with a wall temperature of approximately 500° C. and a centrifugal force of 10000 time the force of gravity on wheat straw, the primary mass yield of fractions will be approximately 34% organics, 22% water (56% liquids in total), 23% char and 21% gas, all on substantially dry ash-free basis. At these conditions the gas phase temperature was found to be approximately 400° C. in a reactor with a feed rate of approximately 20 g/min and an active volume of approximately 0.53 L. Utilizing the kinetic expression for gas phase cracking of cellulose found by Linden et al. (Linden, A. G., Berruti, F., Scott, D. S. A kinetic model for the production of liquids from the flash pyrolysis of cellulose. Chem. Eng. Commun., 65, 1988) the yield of organics after gas phase degradation can be computed to approximately 33% with a corresponding gas residence/retention time of approximately 1.5 s or a relatively minor change from the primary yield. If, on the other hand, gas phase temperature is raised to approximately 600° C. the organics yield would be reduced to approximately 5% whereas a tenfold increase in reactor volume would reduce organics yield to approximately 25%. From these examples it will be clear that a reactor allowing for minimization of the combined effect of temperature and residence time on the gas phase is beneficial in order to obtain pyrolysis liquids from biomass in acceptable yield.

In embodiments of the present invention, the outer wall of the centrifuge chamber may heat the biomass, so that ablative pyrolysis takes place at or near the outer wall. Preferably, this achieved without the use of a separate transport medium, such as sand.

At the step of conveying the pyrolysis vapors away from the centrifuge chamber, the pyrolysis vapors preferably diffuse into a condenser chamber, in which the step of condensation takes place. In a particularly compact embodiment, the centrifuge chamber has an annular cross-section, and the condenser chamber is arranged centrally i.e. coaxially within the rotor, whereby the pyrolysis vapors diffuse through an inner wall of the centrifuge chamber, which is permeable to the vapors. It will thus be appreciated that in the apparatus of the invention, the centrifuge chamber and the condenser chamber are separated by the inner wall of the centrifuge chamber, the inner wall comprising perforations, so as to allow the pyrolysis vapors to diffuse from the centrifuge chamber to the condenser chamber, in which the pyrolysis vapors may at least partly condense into said pyrolysis liquid.

The integration of the reactor (centrifuge chamber) and condenser allows for improved utilization of reactor volume. This contributes to the compactness of the apparatus, in which there is no need for an external condenser remote from the reactor with associated pipes. Additionally, thanks to the integrated condenser and reactor, the gas phase retention time may be reduced, which has shown to improve pyrolysis liquid yield, reduced liquid viscosity and reduced water content.

The perforations of the inner wall may define inlet openings of pipe stubs extending radially into the condenser chamber to provide an inlet to the condenser, which is inwardly displaced in relation to an outer periphery of the condenser chamber. The pipe stubs preferably have a length sufficient to extend beyond condensed pyrolysis liquid, such as viscous tar, which may accumulate at the outer periphery of the condenser chamber.

In order to enhance condensation in the condenser chamber, a central portion of the condenser chamber may accommodate a packing material, on which the at least a portion of the pyrolysis vapors condenses to pyrolysis liquid.

Condensation may further be enhanced by leading a cold fluid into the condenser chamber, e.g. via a pipe arranged centrally within the condenser chamber. The fluid, which is at a temperature below the dew point of the pyrolysis vapors, may be pyrolysis liquid or a hydrocarbon immiscible with pyrolysis liquid. In case pyrolysis liquid is utilized, such pyrolysis liquid may conveniently be derived from the pyrolysis process, so that no external supply of pyrolysis liquid is needed. Any other fluid may be separated from the produced pyrolysis liquid by phase separation and recycled in the process.

The condensation temperature may be controlled by the temperature of the utilized fluid whereby especially the amount of water included in the liquid product may be controlled by partial condensation. At a later stage, the gas may be dried by further cooling in order to increase energy content of the gas and/or mix condensed water with combustible hot char to form a slurry and thus control reactivity.

At least a portion of the char deriving from pyrolysis of the biomass may be in the form of fine particles, which are conveyed away from the centrifuge chamber through openings provided in the outer wall of the centrifuge chamber and into a channel for conveying the particles further. To enhance the flow of particles into the char separation, a flow of vapour may be drawn out with the char particles, preferably by arranging the openings tangentially to the main reactor pipe whereby the motion of the rotor blades will force vapour through the pipes in a fashion similar to a centrifugal compressor. The vapour may be reentered into the reactor through an opening near the raw material intake port(s). In one embodiment of the apparatus of the present invention, a char conveyor is arranged at or near a bottom portion of the centrifuge. The conveyor may e.g. comprise a worm drive for forwarding char in the channel. Alternatively, char may be conveyed under the action of gravity or gas flow. Means may be provided for mixing the char with the pyrolysis liquid to form a slurry or char may be pilletized and collected as a separate high density energy product.

As explained above, centrifugal forces provide an outward pressure on the biomass in the centrifuge chamber toward its outer wall. An even peripheral distribution of material in the centrifuge chamber may be achieved by at least one rotor blade arranged in or extending into the centrifuge chamber, whereby the gas phase and thus suspended biomass, char, pyrolysis vapors in the centrifuge chamber are forced in a peripheral direction. The rotation thereby imparted on the material generates the centrifugal forces for forcing the material toward the hot surface at the outer wall of the centrifuge chamber, at which surface pyrolysis takes place.

The biomass may be led axially or tangentially into the centrifuge chamber. Preferably, the biomass is led tangentially into the centrifuge chamber at one or more positions along the chamber. The biomass may be led into the centrifuge chamber via a plurality of distinct inlets or via one single inlet, e.g. an extended slit forming a widened mouth of a biomass inlet.

Heat for the pyrolysis process may be derived from a furnace arranged coaxially around the centrifuge, whereby heat for the pyrolysis process is transported across the outer wall of the centrifuge chamber by conduction. This coaxial arrangement of the furnace further contributes to overall compactness. In the furnace, at least a portion of said pyrolysis gas, char, liquid or hydrocarbon may be combusted, preferably without any need for external fuel supply. A porous flame stabilizing material in the form of a ceramic material may be incorporated within the furnace to enhance operation. Heating by electric resistance elements, magnetic induction, a condensing vapour, or a hot fluid e.g. liquid salt constitute alternative ways of heating the process.

In the present invention, the rotor may e.g. have an inner diameter of 0.01-5 m, and it is preferably rotated at least 200 rpm. In one embodiment, the diameter of the rotor is approximately 1 meter, the rotor being rotated at approximately 2000 rpm and the biomass particles being subjected to centrifugal forces greater than 2000 times the force of gravity.

In order to efficiently collect and process the biomass, the centrifuge may be comprised in a mobile unit, which may collect the biomass from a growth site, such as a field or forest. The biomass may be continuously fed into the centrifuge, as the mobile unit traverses the growth site. Further biomass may be collected from the growth site by means of the mobile unit concurrently with the step of decomposing the biomass in the pyrolysis apparatus.

It will be appreciated that the provision of the pyrolysis apparatus in the mobile unit allows the pyrolysis process to take place at or near the growth site. Thus, the need for transportation and possibly intermediate storage of the raw material can be significantly reduced in comparison to those prior art methods, which require the pyrolysis to take place at a stationary installation remote from the growth site. Preferably, the pyrolysis takes place while further biomass is simultaneously being collected and continuously fed to the pyrolysis apparatus. Hence, pyrolysis takes place while the mobile unit traverses the growth site, and while biomass is being collected simultaneously. Transportation of relatively large volumes of biomass from the growth site to a remote pyrolysis facility may thus be avoided. As pyrolysis liquid has a significantly higher energy concentration per volume than biomass, a certain amount of energy requires less space when present in the form of pyrolysis liquid than when present in the form of biomass, and the energy may thus be more conveniently conveyed to the intended consumer in the form of pyrolysis liquid. Pyrolysis liquid may be transported from the growth site to the intended consumer or to a storage facility by means of tank trucks or vessels (e.g. ISO tank containers), or conveyed through pipe lines under adequate pumping action.

The mobile unit may comprise a wheeled support structure. A coupling system may be provided for coupling the unit to a power-driven vehicle. Alternatively, the mobile unit may incorporate an engine or motor, so that the mobile unit is self-propelled. The engine or motor of the mobile unit may utilize the pyrolysis gas, pyrolysis liquid and/or char as fuel, whereby the need for a separate fuel source of the mobile unit may be reduced or even eliminated. Likewise, in embodiments of the invention, in which the mobile unit is not self-propelled, the propelling drive means, e.g. tractor or truck, may utilize the pyrolysis gas, pyrolysis liquid and/or char as a fuel source.

To efficiently cool waste char from the pyrolysis process before possible ejection thereof from the mobile unit, the process may include the step of collecting dirt from the growth site and mixing the dirt with the char to thereby cool the char. In other words, dirt may be utilized as a cooling source for waste matter deriving from pyrolysis, and the need for e.g. water cooling may be eliminated. It will hence be appreciated that the mobile unit may comprise a dirt collector for collecting dirt from the growth site and a mixer for mixing the dirt with the char to thereby cool the char, as well as a dirt and char ejector for ejecting the mix or slurry of char and dirt from the mobile unit. Alternatively, water derived from drying pyrolysis gas obtained by partially condensing the pyrolysis vapour may be utilized to cool the reactive char by mixing the two ingredients to a slurry.

The mix of char and dirt or the char/water slurry may be fed into a furrow formed by appropriate means of the mobile unit, such as by a tine. The tine may be arranged such with respect to the dirt and char ejector that the mix of char and dirt can be fed into the furrow during use of the mobile unit. Subsequently, the char mix may be covered with dirt to enhance decomposition of the char.

At least a portion of the pyrolysis gas produced by the pyrolysis process may be combusted in a furnace forming part of the pyrolysis apparatus, the furnace producing heat for the Pyrolysis process. Exhaust fume of the furnace may be expelled via a fume outlet of the furnace. In addition to pyrolysis gas, at least a portion of the char may be combusted in the furnace.

Prior to feeding of the biomass into the pyrolysis apparatus, the biomass may be fed to a pre-heating device, in which it is preheated and possibly dried before it enters the pyrolysis apparatus. The exhaust fume produced in the furnace may be utilized as a heat source in the pre-heating device. Exhaust fume from the furnace may also be guided to a first heat exchanger, in which it heats intake air for the furnace. Alternatively or additionally, a conduit, which is connectable to an exhaust outlet of the power-driven vehicle or an exhaust outlet of the engine of the mobile unit, may be provided to allow exhaust gas of the vehicle or of the engine as a heat source in the first heat exchanger or in the process of pre-heating and/or drying the biomass.

The mobile unit may advantageously include a shredder for shredding the collected biomass upstream of the pyrolysis apparatus, e.g. upstream of the pre-heating device. A biomass buffer may be included to allow more biomass to be collected than what is being processed in the pyrolysis apparatus. For example, operation of the collector may be interrupted e.g. for maneuvering the vehicle or for inspection without interruption of the pyrolysis apparatus. In one embodiment, the pre-heating device serves as the biomass buffer.

At the step of separating the pyrolysis liquid from the char and pyrolysis gas, the pyrolysis liquid and at least a portion of the pyrolysis gas may be conveyed to a separator for separating the pyrolysis liquid from the pyrolysis gas, and at least a portion of the separated pyrolysis gas may be conveyed back to the furnace as a fuel source therein. Further, at least a portion of the separated liquid may be conveyed back to the pyrolysis apparatus as a cooling source in a pyrolysis condenser. The condenser may be integrated in the pyrolysis apparatus, or it may be constitute a separate unit, which does not form part of the pyrolysis apparatus. Before the liquid enters the condenser, it is preferably cooled in a second heat exchanger, which may utilize air as a cooling source. The air, which exits the second heat exchanger, may be mixed with the intake air for the furnace upstream or downstream of the first heat exchanger, e.g. to improve combustion efficiency in the furnace.

In one embodiment, the pyrolysis apparatus comprises a centrifuge defining a centrifuge chamber, and at the step of decomposing the biomass, the method of the invention may comprise the step imparting rotation on the biomass in the centrifuge, whereby the biomass is forced towards an outer wall of the centrifuge chamber. The outer wall of the centrifuge chamber is maintained at a temperature of 350-700° C. to effect a pyrolysis process at or near the outer wall of the centrifuge chamber, whereby the biomass decomposes into the pyrolysis liquid, pyrolysis gas and char, the gas and liquid being on gaseous form.

In a particularly compact embodiment of the pyrolysis apparatus, the condenser is integrated in the pyrolysis apparatus. In this embodiment, the centrifuge chamber of the pyrolysis apparatus is delimited by an inner wall and an outer wall, and an outlet is provided for feeding biomass into the centrifuge chamber. A rotor is arranged to impart rotation on the gas phase and the biomass suspended herein within the centrifuge chamber to force the biomass towards the outer wall of the centrifuge chamber under the action of centrifugal forces. A heating system is included for maintaining the outer wall of the centrifuge chamber at a temperature of 350-700° C. to effect the pyrolysis process at or near the outer wall of the centrifuge chamber and to thereby decompose the biomass into char, pyrolysis gas and pyrolysis vapours, which can be condensed into pyrolysis liquid in the condenser. The heating system may include the furnace as describe above, the centrifuge being preferably arranged coaxially within the furnace, whereby heat for the pyrolysis process is transported across the outer wall of the centrifuge by conduction. The inner wall of the centrifuge chamber may be permeable to the pyrolysis vapours and gas, so that the condenser may be arranged centrally within the centrifuge chamber.

BRIEF DESCRIPTION OF THE DRAWINGS

An embodiment of the invention will now be further described with reference to the drawings, in which.

DETAILED DESCRIPTION OF THE DRAWINGS

Figure 1:
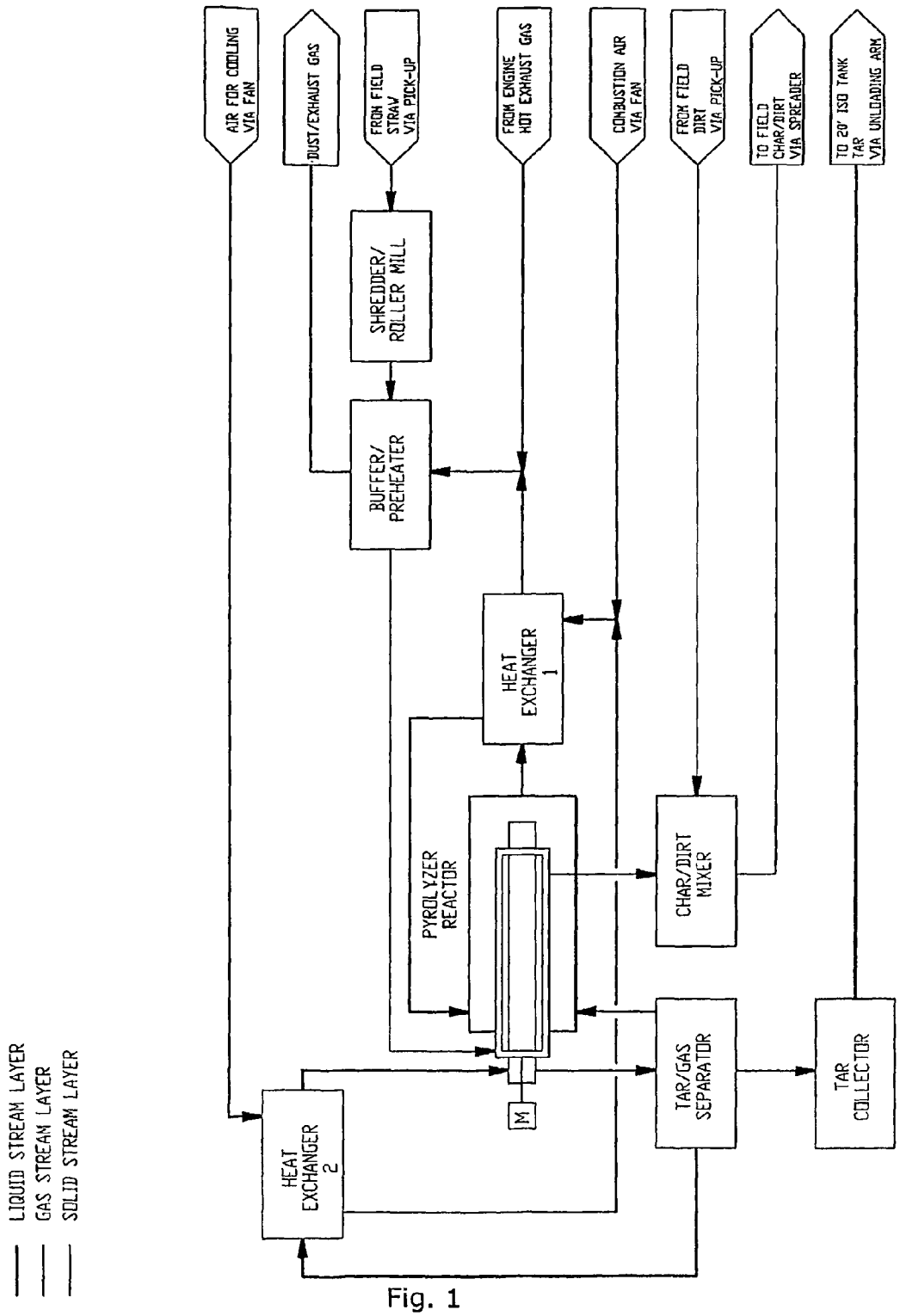
FIG. 1 is a chart illustrating implementation of an embodiment of the method and apparatus of the present invention.

FIG. 1 illustrates the flow of air, gas and liquid in a system incorporating a pyrolysis apparatus as disclosed herein. The system may be accommodated on a mobile unit for simultaneously collecting biomass and processing biomass in a pyrolysis process. The system includes a pyrolysis apparatus 200, which will be described in more detail below with reference to FIGS. 2 and 3. A motor 102 is provided for driving a rotor of the pyrolysis apparatus. In tar/gas separator, pyrolysis liquid in the form of tar is separated from gas. Part of the separated tar is led to a heat exchanger as described further below, and the remaining tar is collected in tar collector 106. Gas is led from the tar/gas separator into a furnace of the pyrolysis apparatus, in which it is utilized as fuel for producing heat required in the pyrolysis process. As shown in the right-hand end of FIG. 1, biomass such as straw is picked up from a field or from another growth site and fed into a shredder, such as a roller mill 108, from which it is fed to a buffer and pre-heating device 110. Heat is transported to the pre-heating device with exhaust gas from the furnace of the pyrolysis apparatus 200 and/or with exhaust gas from an engine of the mobile unit or from a truck or tractor driving the mobile unit. Exhaust gas from the furnace of the pyrolysis apparatus is conveyed through a first heat exchanger 112, in which it heats combustion air for the furnace. As shown in the upper left corner of FIG. 1, a second heat exchanger 114 is provided for cooling that part of the tar separated in the tar/gas separator 104, which is led back into the pyrolysis apparatus. The cooling source for the second heat exchanger 114 is air, which may be led through the first heat exchanger 112 after it has passed the second heat exchanger 114, but before it enters the furnace of the pyrolysis apparatus.

In this configuration, char, which is conveyed away from the pyrolysis apparatus, is mixed with dirt picked up from the growth site in a char/dirt mixer 116 to form a char/dirt mixture. The mixture may advantageously be distributed on the growth site, e.g. a field, for instance into a furrow formed by a tine of the mobile unit.

Figure 2:
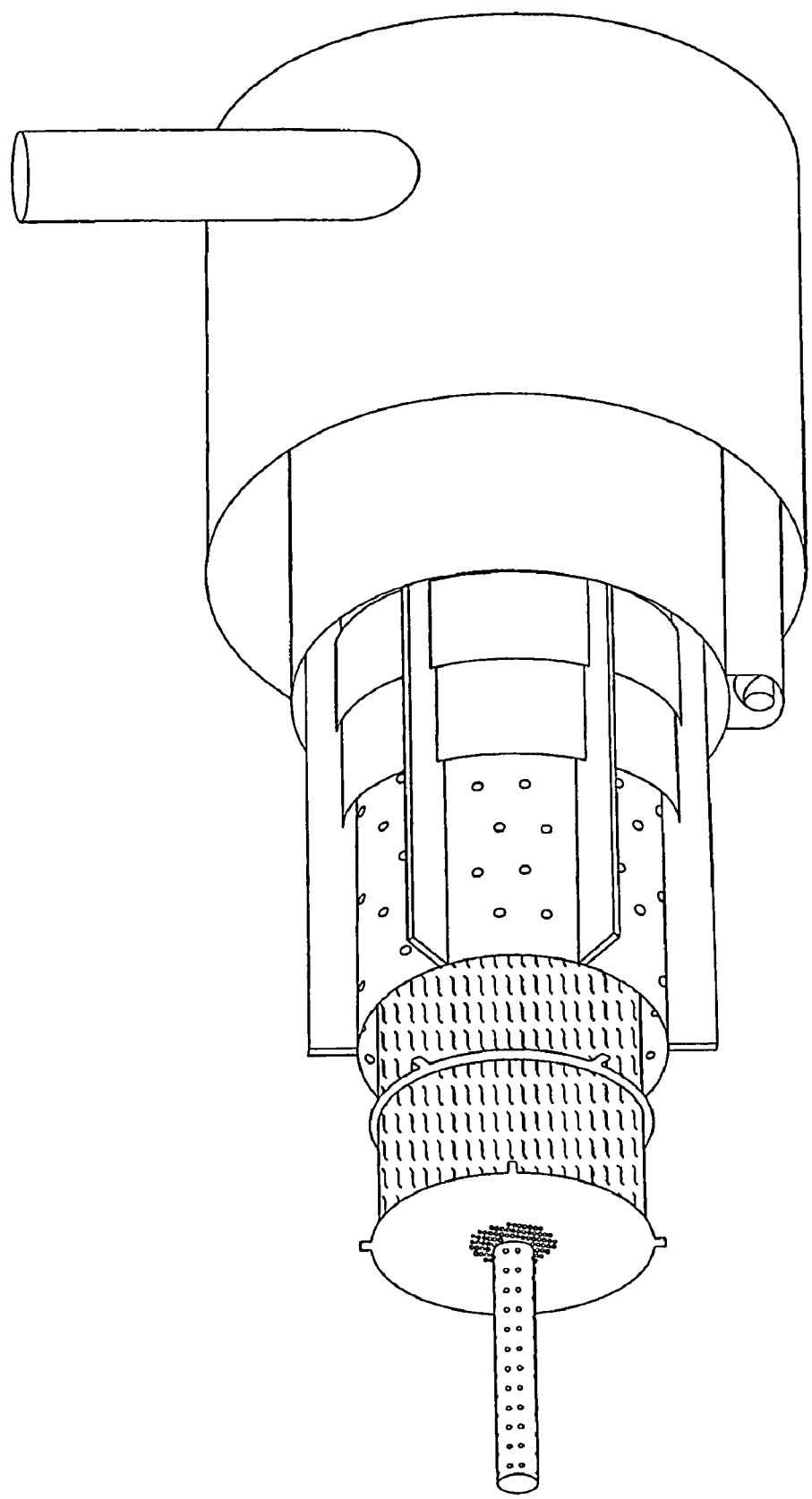
FIG. 2 is a perspective illustration of a pyrolysis apparatus.

The pyrolysis apparatus 200 is shown in more detail in FIG. 2. It comprises a biomass inlet pipe 202, through which biomass is conveyed into a centrifuge chamber or reactor 204 surrounded by a furnace 206. The centrifuge chamber 204 has an outer wall 208, through which heat is conducted from the furnace for effecting pyrolysis in the centrifuge chamber at or near the outer wall 208. A rotor 210 forms a perforated inner wall 212 of the centrifuge chamber, the rotor being provided with rotor blades 214 for rotating the gas phase and the biomass suspended herein within the centrifuge chamber. During operation of the apparatus, biomass and other material in the centrifuge chamber, such as char and pyrolysis vapors are forced by centrifugal forces towards the reactive surface at the outer wall 208 of the centrifuge chamber 204, at which pyrolysis is effected. Heat deflectors 216 are secured to the rotor blades for limiting heat radiation from the furnace 206 onto the inner wall 212 of the centrifuge chamber, which surrounds a condenser to be kept at a limited temperature well below the pyrolysis temperature of about 350-700° C.

Condenser 218 is arranged coaxially within the centrifuge chamber 204 and comprises a packing material 220 for enhancing condensation. Equidistant baffle plates 222 provide a support for the packing material and for the shell of the condenser 218, and perforations 224 in the baffle plates 222 guide pyrolysis gas through the condenser to optimize gas/liquid contact. Cold liquid is fed into the condenser via a perforated cooling feed pipe 226.

A bottom portion of the wall 208 may be provided with holes or perforations allowing char to fall into a channel 228, in which the char is conveyed away from the pyrolysis apparatus by means of e.g. a worm drive conveyor 230.

It will be appreciated that the furnace, centrifuge chamber, rotor, condenser, and char conveyor extend the entire length of the pyrolysis apparatus, the various parts being cut-off in FIG. 2 for illustrative purposes only.

Figure 3:
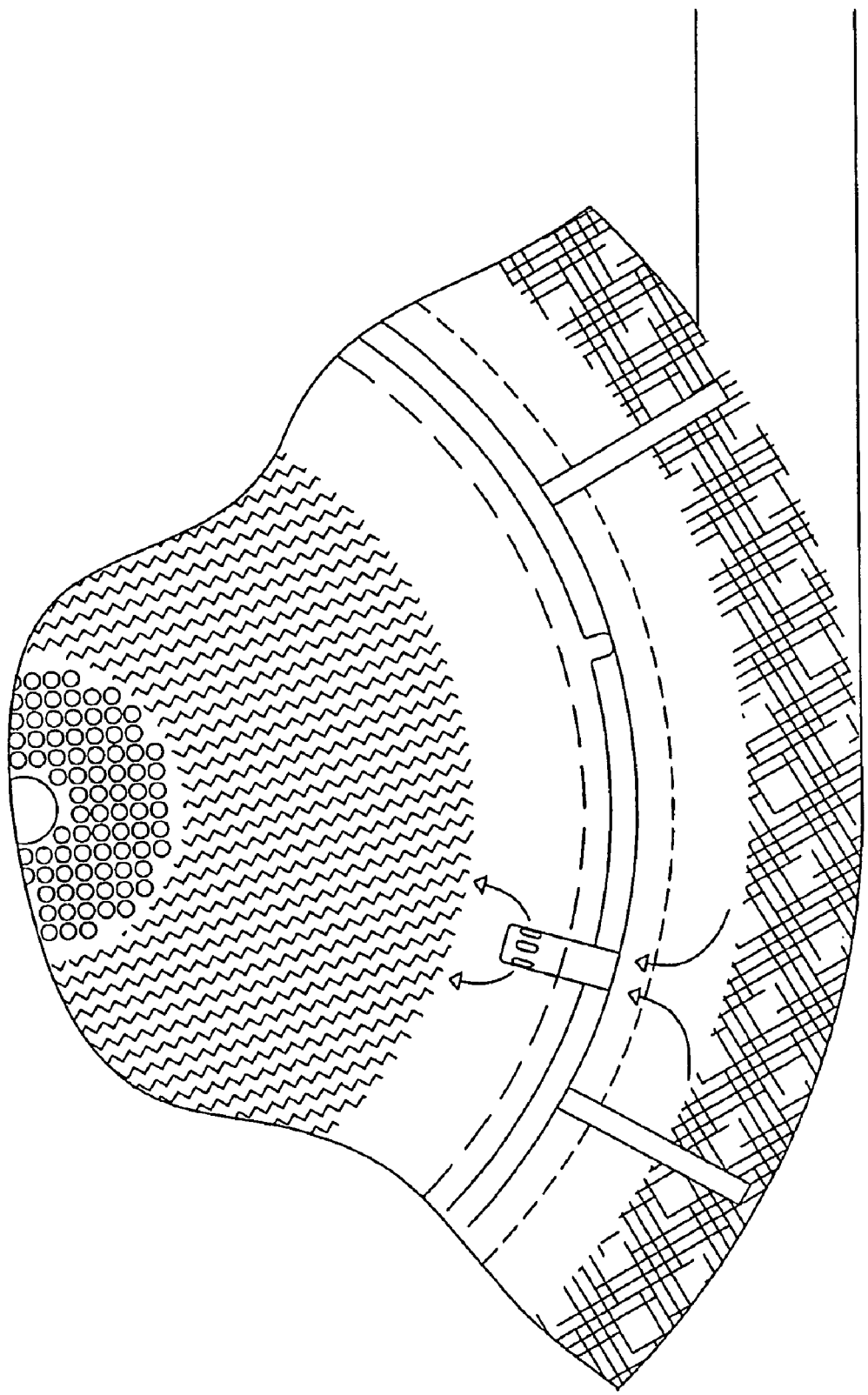
FIG. 3 is a partial cross-sectional view through the pyrolysis apparatus of FIG. 2.
Figure 1:
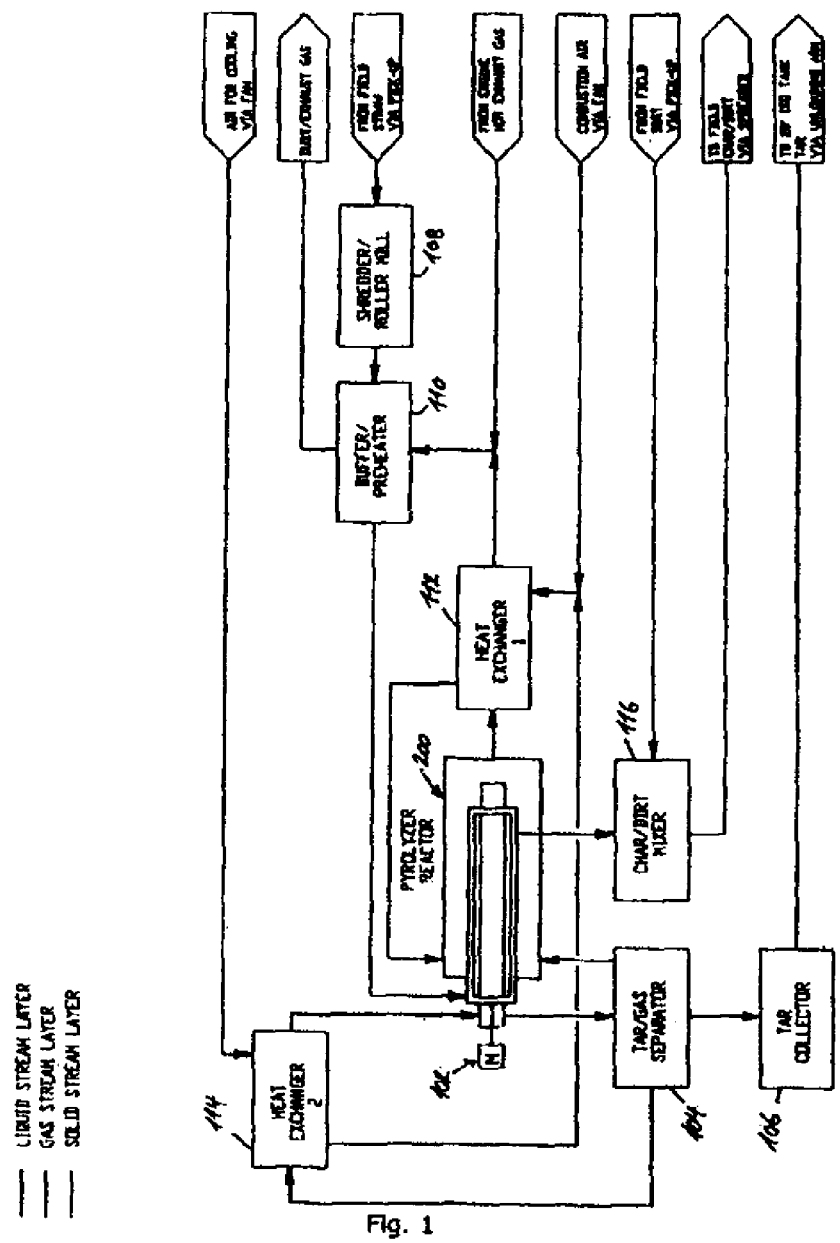
Figure 2:
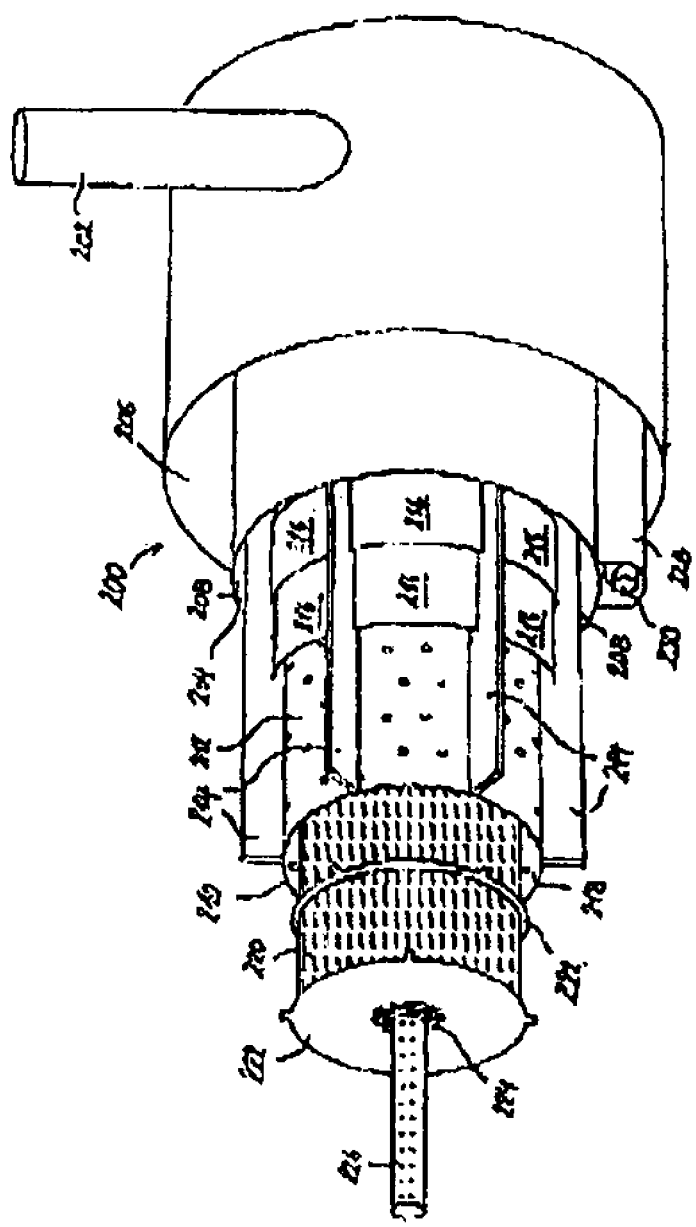
Figure 3:
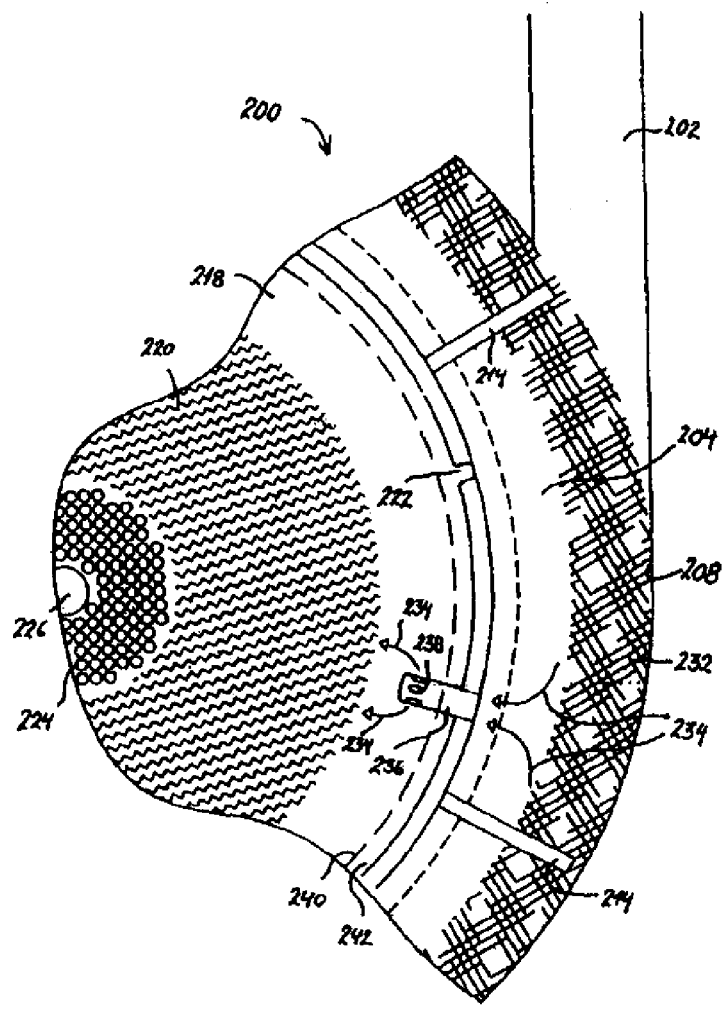

FIG. 3 shows a partial cross-section through the pyrolysis apparatus 200. The furnace 206 shown in FIG. 2 is not included in FIG. 3 for the sake of clarity. Biomass in the centrifuge chamber 204 is illustrated as hatched area 232. As illustrated by arrows 234, pyrolysis vapors diffuse into the condenser 218 via perforations in the inner wall 212 of the centrifuge chamber 204 (see FIG. 2), there being provided an inwardly projecting pipe stub 236 at each perforation. Each pipe stub 236 has a plurality of openings 238 located above the surface of the condensed pyrolysis liquid 240, through which gas may escape into the condenser 218. The pipe stubs 236 have a length sufficient to extend through a layer of condensed pyrolysis liquid, e.g. tar, which has accumulated at the outer periphery of the condenser.

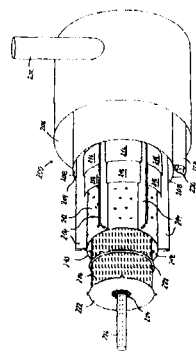

The invention claimed is:

1. A method for producing pyrolysis liquid from biomass, comprising the step of decomposing the biomass into pyrolysis liquid, char and pyrolysis gas in a fast pyrolysis process, the method comprising the steps of:
    feeding the biomass into a centrifuge chamber;
    rotating a rotor to impart rotation on biomass distributed in gas volume in the centrifuge chamber, whereby the biomass is forced towards an outer wall of the centrifuge chamber by centrifugal forces, which provide an even pressure of biomass against said outer wall of the centrifuge chamber;
    decomposing the biomass into pyrolysis vapors and char by maintaining said outer wall at a temperature of 350-700 degrees Celsius to effect the pyrolysis process at or near the outer wall of the centrifuge chamber;
    separating the pyrolysis vapours and char;
    conveying the pyrolysis vapors and char away from the centrifuge chamber;
    condensing the at least a portion of said pyrolysis vapors to obtain said pyrolysis liquid and pyrolysis gas.

2. The method of claim 1, wherein biomass in the rotor is subjected to centrifugal forces greater than 2000 times the force of gravity.

3. The method of claim 1, wherein the gas phase retention time in the rotor is at most 5 seconds.

4. The method of claim 1, wherein the ratio between the diameter of the rotor and the diameter of the centrifuge chamber is at least 0.5.

5. The method of claim 1, wherein the outer wall of the centrifuge chamber heats the biomass, so that ablative pyrolysis takes place at or near the outer wall.

6. The method of claim 1, wherein, at the step of conveying, the pyrolysis vapors diffuse into a condenser chamber, in which said step of condensation takes place.

7. The method of claim 6, wherein the centrifuge chamber has an annular cross-section, and wherein the condenser chamber is arranged centrally within the rotor, whereby, at the step of conveying, the pyrolysis vapors diffuse through an inner wall of the centrifuge chamber, which is permeable to the vapors.

8. The method of claim 6, wherein the condenser chamber accommodates a packing material, on which the at least a portion of the pyrolysis vapors condense to pyrolysis liquid.

9. The method of claim 6, wherein a cold fluid is led into the condenser chamber, the fluid being at a temperature below the dew point of the pyrolysis vapors.

10. The method of claim 9, wherein the cold fluid is led into the condenser chamber via a pipe arranged coaxially within the condenser chamber.

11. The method of claim 6, wherein the cold fluid is pyrolysis liquid or a hydrocarbon immiscible with pyrolysis liquid.

12. The method of claim 1, wherein at least a portion of said char is in the form of fine particles, which, at the step of conveying, are conveyed away from the centrifuge chamber through openings provided in the outer wall of the centrifuge chamber and into a channel for conveying the particles further.

13. The method of claim 12, wherein the flow of particles through the openings in the outer wall of the centrifuge chamber is promoted by drawing a flow of vapours out of the centrifuge chamber, said openings extending essentially tangentially to a longitudinal axis of the centrifuge chamber, and said channel being dimensioned to provide a stagnant zone, in which said particles essentially separate from the vapour, the method further comprising:
    forcing the vapours through said channel under the influence of a pressure gradient provided by the rotation of the rotor;
    recycling the essentially particle-free vapours to the centrifuge chamber through at least one opening near one or more intake ports of the centrifuge chamber.

14. The method of claim 12, wherein the char is conveyed in said channel by means of a conveyor and/or under the action of gravity.

15. The method of claim 1, wherein the gas phase and thus the suspended biomass, char, pyrolysis vapors in the centrifuge chamber are forced in a peripheral direction by means of at least one rotor blade arranged in the centrifuge chamber.

16. The method of claim 1, wherein, at the step of feeding, the biomass is led tangentially into the centrifuge chamber.

17. The method of claim 1, wherein the centrifuge is arranged coaxially within a furnace whereby heat for the pyrolysis process is transported across the outer wall of the centrifuge chamber by conduction, the method further comprising the step of combusting at least a portion of said pyrolysis gas, char, liquid or hydrocarbon in the furnace.

18. The method of claim 1, wherein the centrifuge is comprised in a mobile unit, the method further comprising the steps of:
   collecting the biomass from a growth site by means of a mobile unit;
   at said step of feeding: continuously feeding the biomass into the centrifuge, as the mobile unit is moved across the growth site;
   collecting further biomass from the growth site by means of the mobile unit, the step of collecting further biomass being carried out concurrently with said step of decomposing.

19. The method of claim 18, wherein the pyrolysis vapours are partially condensed in a primary condenser, the method further comprising:
   drying the gas originating from the partial condensation and utilizing at least a portion thereof as fuel for a furnace and/or for an engine for propelling the mobile unit;
   mixing the resulting liquid phase consisting largely of water with the char to obtain a slurry;
   distributing the slurry over the growth site and/or collecting it for further processing or combustion;
   leading the vapours formed in the process of contacting hot char with liquid to a tertiary condenser in order to utilize components having a lower boiling point than water;
   admixing the vapour from the tertiary condenser with liquid product produced by the primary condenser.

20. A mobile unit comprising an apparatus according to claim 18.

21. The method of claim 1, wherein rotor has an inner diameter of 0.01-5 m and is rotated at least 200 rpm.

22. A fast pyrolysis apparatus for producing pyrolysis liquid, char and pyrolysis gas from biomass, comprising:
   a centrifuge chamber delimited by an inner wall and an outer wall;
   an inlet through which biomass can be fed into the centrifuge chamber;
   a rotor arranged to impart rotation biomass distributed in gas volume in the centrifuge chamber to force the biomass towards the outer wall under the action of centrifugal forces, the rotor being arranged to rotate at a speed sufficient to ensure that said centrifugal forces provide an even pressure of biomass against said outer wall of the centrifuge chamber;
   a heating system for maintaining said outer wall at a temperature of 350-700 degrees Celsius to effect the pyrolysis process at or near the outer wall of the centrifuge chamber and to thereby decompose the biomass into char and pyrolysis vapors, which can be condensed to form pyrolysis liquid and pyrolysis gas;
   a char conveyor for conveying the char away from the centrifuge chamber; and wherein:
   the inner wall of the centrifuge chamber is permeable to said pyrolysis vapors.

23. The apparatus of claim 22, wherein the rotor and its rotation is configured to subject biomass therein to centrifugal forces greater than 2000 times the force of gravity.

24. The apparatus of claim 22, wherein the rotor is dimensioned and operable to limit the gas phase retention time in the rotor to at most 5 seconds.

25. The apparatus of claim 22, wherein the ratio between the diameter of the rotor and the diameter of the centrifuge chamber is at least 0.5.

26. The apparatus of claim 22, wherein the centrifuge chamber constitutes an ablative reactor, in which heat for the pyrolysis process can be transmitted from the outer wall of the centrifuge chamber to the biomass.

27. The apparatus according to claim 22, wherein the rotor is essentially cylindrical.

28. The apparatus of claim 27, wherein the centrifuge chamber has an annular cross section, and wherein a condenser chamber is arranged centrally within the centrifuge chamber, the centrifuge chamber and the condenser chamber being separated by said inner wall of the centrifuge chamber, the inner wall comprising perforations, so as to allow the pyrolysis vapors to diffuse from the centrifuge chamber to the condenser chamber, in which the pyrolysis vapors may at least partly condense into said pyrolysis liquid.

29. The apparatus of claim 22, wherein the perforations of the inner wall defines inlet openings of pipe stubs extending radially into the condenser chamber.

30. The apparatus of claim 22, wherein a central portion of the condenser chamber accommodates a packing material.

31. The apparatus of claim 22, further comprising a pipe arranged centrally within the condenser chamber for leading a cold fluid into the condenser chamber to promote condensation.

32. The apparatus of claim 22, wherein the rotor comprises at least one rotor blade extending into the centrifuge chamber.

33. The apparatus of claim 22, wherein the char conveyor is arranged at or near a bottom portion of the centrifuge.

34. The apparatus of claim 33, further comprising means for mixing the char with the pyrolysis liquid to form a slurry.

* * * * *

UNITED STATES PATENT AND TRADEMARK OFFICE
CERTIFICATE OF CORRECTION

PATENT NO. : 7,931,783 B2
APPLICATION NO. : 11/919653
DATED : April 26, 2011
INVENTOR(S) : Kim Dam-Johansen et al.

It is certified that error appears in the above-identified patent and that said Letters Patent is hereby corrected as shown below:

The title page should be deleted to appear as per attached title page.

Figures 1-3 should be deleted to appear as per attached figures 1-3.

Signed and Sealed this
Eighth Day of May, 2012

David J. Kappos
*Director of the United States Patent and Trademark Office*

(12) United States Patent
Dam-Johansen et al.

(10) Patent No.: US 7,931,783 B2
(45) Date of Patent: Apr. 26, 2011

(54) PYROLYSIS METHODS AND APPARATUS

(75) Inventors: Kim Dam-Johansen, Frederiksværk (DK); Niels Bech, Virum (DK); Peter A. Jensen, København S (DK)

(73) Assignee: Danmarks Tekniske Universitet, Lyngby (DK)

(*) Notice: Subject to any disclaimer, the term of this patent is extended or adjusted under 35 U.S.C. 154(b) by 460 days.

(21) Appl. No.: 11/919,653

(22) PCT Filed: May 3, 2006

(86) PCT No.: PCT/DK2006/000241
§ 371 (c)(1),
(2), (4) Date: Oct. 31, 2007

(87) PCT Pub. No.: WO2006/117005
PCT Pub. Date: Nov. 9, 2006

(65) Prior Publication Data
US 2008/0264771 A1 Oct. 30, 2008

Related U.S. Application Data

(60) Provisional application No. 60/676,959, filed on May 3, 2005.

(30) Foreign Application Priority Data

May 3, 2005 (EP) .................................. 05076034

(51) Int. Cl.
C10B 53/02 (2006.01)
C10C 5/00 (2006.01)
C10B 47/22 (2006.01)

(52) U.S. Cl. ............... 201/3; 201/21; 201/29; 201/41; 202/96; 202/218; 202/267.1; 202/239; 422/198; 422/224

(58) Field of Classification Search ............... 201/3, 21, 201/29, 41; 202/96, 218, 267.1, 239; 422/198, 422/224; 585/240
See application file for complete search history.

(56) References Cited

U.S. PATENT DOCUMENTS 4,942,269 A * 7/1990 Chum et al. .............. 585/240
(Continued)

FOREIGN PATENT DOCUMENTS
CA 2 365 785 6/2003
(Continued)

OTHER PUBLICATIONS

"Ablative Plate Pyrolysis of Biomass for Liquids", Peacocke and Bridgwater, Biomass and Bioeng; vol. 7, No. 1-6, pp. 147-154, 1994. Elsevier Science Ltd.*

(Continued)

Primary Examiner — N. Bhat
(74) Attorney, Agent, or Firm — Birch, Stewart, Kolasch & Birch, LLP

(57) ABSTRACT

A fast pyrolysis apparatus (200) for producing pyrolysis liquid, such as oil or tar, char and pyrolysis gas from biomass, such as straw, comprises a centrifuge chamber (204) and a rotor (210) arranged to impart rotation on the biomass in the centrifuge chamber to force the biomass outwardly under the action of centrifugal forces. A furnace (206) arranged coaxially around the centrifuge chamber (204) maintains the temperature at an outer reactive wall of the centrifuge chamber at an elevated temperature to effect the pyrolysis process at or near the reactive wall. The apparatus comprises a condenser (218) arranged coaxially with and surrounded by the centrifuge chamber (204). The apparatus may be accommodated by a mobile unit for simultaneously collecting biomass from a field and processing the biomass in the apparatus.

34 Claims, 3 Drawing Sheets